(12) United States Patent
Aubert et al.

(10) Patent No.: US 6,810,130 B1
(45) Date of Patent: Oct. 26, 2004

(54) APPARATUS FOR ASSISTING MAKEUP AND AN ASSEMBLY CONSTITUTED BY SUCH APPARATUS AND APPARATUS FOR DELIVERING MAKEUP HAVING A PREDETERMINED BRDF AS SELECTED BY THE APPARATUS FOR ASSISTING MAKEUP

(75) Inventors: Johan Aubert, Paris (FR); Christophe Dauga, Paris (FR)

(73) Assignee: L'Oreal, Paris (FR)

( * ) Notice: Subject to any disclaimer, the term of this patent is extended or adjusted under 35 U.S.C. 154(b) by 555 days.

(21) Appl. No.: 09/671,344

(22) Filed: Sep. 27, 2000

(30) Foreign Application Priority Data

Sep. 29, 1999 (FR) .............................................. 99 12137

(51) Int. Cl.⁷ .......................... G06K 9/00; G09B 19/18; A61B 1/04; A61B 1/06; H04N 7/18; H04N 9/47
(52) U.S. Cl. .......................... 382/100; 434/100; 348/68
(58) Field of Search .......................... 382/100; 434/100, 434/98; 348/68, 77, 128–132, 136; 345/706, 757, 771, 778

(56) References Cited

U.S. PATENT DOCUMENTS

| | | | |
|---|---|---|---|
| RE31,887 E | * 5/1985 | Hodgson | 428/355 EN |
| 5,163,010 A | * 11/1992 | Klein et al. | 700/239 |
| 5,478,238 A | 12/1995 | Gouriou et al. | 434/100 |
| 5,537,211 A | * 7/1996 | Dial | 356/402 |
| 5,543,961 A | * 8/1996 | Smith | 359/350 |
| 5,686,987 A | * 11/1997 | Hewitt et al. | 356/237.1 |
| 5,797,750 A | 8/1998 | Gouriou et al. | |
| 6,095,650 A | * 8/2000 | Gao et al. | 351/227 |
| 6,437,866 B1 | * 8/2002 | Flynn | 356/402 |

FOREIGN PATENT DOCUMENTS

| | | |
|---|---|---|
| EP | 0 226 959 A2 | 7/1987 |
| EP | 0 588 243 A1 | 3/1994 |
| FR | 2 728 982 A | 7/1996 |
| FR | WO 96/21201 * | 7/1996 |
| JP | 11143352 | 5/1999 |

OTHER PUBLICATIONS

Hanrahan et al., "Reflection from Layered Surfaces due to Subsurface Scattering," 1993, ACM, pp. 165–174.*
Marschner et al., "Reflectance Measurements fo Human Skin," Jan. 1999, SIGGRAPH 99, pp. 1–11.*
The "Nikkei Weekley", Dec. 21, 1998, article entitled *"Video method enhances skin views for cosmetics development, consulting"*.
Computer Graphics, vol. 15, No. 3, Aug. 1981, "A Reflectance Model For Computer Graphics"; Robert L. Cook and Kenneth E. Torrance.
"Skin Optics", Oregon Medical Center News, Jan. 1998, Steven L. Jacques.
He et al., *A Comprehensive Physical Model for Light Reflection*, Computer Graphics, vol. 25, No. 4, XP–000922854, pp. 175–186 (1991).
Vannier et al., *Facial Surface Scanner*, IEE Computer Graphics and Applications, No. 6, pp. 72–80 (1991).

* cited by examiner

*Primary Examiner*—Daniel Mariam
*Assistant Examiner*—Shefali Patel
(74) *Attorney, Agent, or Firm*—Oliff & Berridge, PLC

(57) ABSTRACT

The apparatus for assistance in makeup includes a measurement unit for measuring local phenomena of light interaction with a zone to be made up and/or treated; a database relating to the BRDF of various cosmetic and/or care products; a selector unit enabling a product to be selected; a calculation unit for calculating the resulting BRDF to the zone virtually made up or treated with the product, on the basis of measurement previously taken and on the basis of information taken from the database and relating to the BRDF of the selected makeup product; and a display unit for displaying the zone virtually made up or treated in this way as a result of the previously calculated resulting BRFD.

32 Claims, 3 Drawing Sheets

FIG_1

APPARATUS FOR ASSISTING MAKEUP AND AN ASSEMBLY CONSTITUTED BY SUCH APPARATUS AND APPARATUS FOR DELIVERING MAKEUP HAVING A PREDETERMINED BRDF AS SELECTED BY THE APPARATUS FOR ASSISTING MAKEUP

The present invention relates to apparatus for assisting makeup.

BACKGROUND OF THE INVENTION

Apparatus is known, in particular from international application WO 96/21201, comprising an acquisition unit for acquiring a 2D image of a face and image processing means to display the virtual application of makeup on the face.

The Dec. 21, 1998 number of The Nikkei Weekly magazine discloses work enabling a made-up face to be displayed as a 3D image.

Known apparatuses do not make it possible to take account, amongst other things, of the lighting conditions in which a made-up subject is going to move around.

In particular, a person can make up at home under artificial light and then move outside, such that the rendering of the makeup is different.

Finally, known apparatuses are poorly adapted at simulating the application of a makeup that masks little, is transparent, or diffuses slightly, and they take no account of the physical phenomena of light interaction between the skin and the cosmetic.

Thus, simulating the application of glossy or shiny makeup is not satisfactory.

There exists a need to simulate the application of makeup while taking account of the ambient lighting in which the made-up person is going to move about, thus enabling a person to make up or to select makeup as a function of particular lighting conditions.

OBJECTS AND SUMMARY OF THE INVENTION

A particular object of the invention is to provide apparatus for assistance in makeup that makes it easy to simulate in realistic manner the application of a given makeup, e.g. on the face, for various lighting conditions.

The novel apparatus of the invention for assistance in makeup comprises:

- a measurement unit for measuring local phenomena of light interaction with a zone to be made up and/or treated;
- a database relating to the BRDF of various cosmetic and/or care products;
- selector means enabling a product to be selected;
- calculation means for calculating the resulting BRDF of the zone virtually made up or treated with the product, on the basis of measurements previously taken and on the basis of information taken from said database and relating to the BRDF of the selected makeup product; and
- display means for displaying the zone virtually made up or treated in this way as a result of the previously calculated resulting BRDF.

BRDF stands for bidirectional reflectance distribution function, it is well known to specialists in synthesized images, and it depends on various geometrical and physical parameters associated with the light source used, the nature of the illuminated target, and the conditions of illumination and of observation.

This function makes it possible in particular to take account of the angle of incidence of the light, the angle of observation, the nature of the illuminated skin, and its surface appearance.

By means of the invention, it is possible to simulate virtual application of a cosmetic and/or care product while taking account in particular of the fact that the color at a point on the face depends on the geometrical extent of the light source, and thus on the directions of incidence of light on the illuminated surface, on the spectral characteristics of said light, on the nature of the illuminated surface, and on the direction from which it is observed.

The apparatus of the invention for assistance in makeup thus makes it possible to take into consideration the goniochromatic aspects of the makeup and/or care product used, in particular the way its reflectance, its transparency, and its masking power vary as a function of the direction of observation.

The invention also makes it possible to take account of light diffusion through the makeup.

The invention thus makes it possible to simulate optical effects specific to the makeup used, for example its mattness, its gloss, or its iridescence.

In a preferred implementation of the invention, the apparatus includes calculator means organized to calculate the BRDF parameters of the zone to be made up and/or treated on the basis of the measurements performed.

Thus, a relatively limited number of measurement points within the zone to be made up or treated can suffice, the BRDF parameters being determined by the calculation means on the basis of the measurements performed.

Preferably, the parameters used for calculating BRDF are the absorption coefficient $\mu_a(\lambda)$, the diffusion coefficient $\mu_s(\lambda)$, the diffusion anisotropy coefficient q, the refractive index $n(\lambda)$, and the roughness coefficient m, $\lambda$ being the wavelength of the light.

Advantageously, the skin parameters $\mu_a(\lambda)$ and $\mu_s(\lambda)$ are calculated on the basis of a model using as its variables the melanin content in the epidermis, the blood content in the dermis, and its degree of oxidation.

In a particular embodiment, the apparatus for assistance in makeup includes a control member enabling the user to input information associated with the way in which the cosmetic product is to be applied to the face.

The control member may comprise a force feedback mouse.

Thus, the user can determine the intensity of makeup by exerting greater or smaller force on the control member.

This makes it possible to simulate making up by means of a pencil, for example, which leaves a colored mark of greater or lesser intensity when it is pressed with greater or lesser force against the skin, the intensity corresponding to greater or smaller thicknesses and densities of the makeup.

Advantageously, the apparatus for assistance in makeup includes an expert system which, on the basis of data provided by the user, selects a makeup product as a function of predetermined criteria, in order to match the color of the makeup to that of the eyes or the hair of the user, for example.

On this topic, reference can be made to European patent application EP-A-0 646 339, for example.

Advantageously, the display means comprise stereoscopic display means so as to make the simulation more realistic.

In a particular embodiment, the measurement unit includes a sphere provided with means for lighting the subject present in the sphere and means for acquiring images that are arranged to enable local data of the subject to be acquired to be treated.

The measurement unit may include apparatus for acquiring the topography of the face, which apparatus is selected from the following kinds of apparatus: stereo viewing apparatus that operates by simultaneous acquisition of a profile view and a front view; laser triangular apparatus; fringe projection apparatus.

Advantageously, the measurement unit includes apparatus for acquiring the spectral reflectance of the face, enabling the color of the face to be determined at a set of points, at a given illumination angle, and at a given observation direction.

The measurement unit can detect dyschromias, e.g. acne rosacea or areas of pigmentation.

Advantageously, the database relating to the BRDF of cosmetic and/or care products comprises a database relating to the BRDF of products selected from the following list: foundations, lipsticks, cheek blushers, eyeliners, mascara, nail varnishes, hair dyes, skin coloring products, semi-permanent makeup products (e.g. for tattoos).

Advantageously, said database includes information relating to the BRDF of the products for different thicknesses of deposit.

Advantageously, the measurement unit is associated with shape recognition means enabling parts of the face to be identified.

Preferably, the shape recognition means are arranged to detect wrinkles or folds in the skin.

Thus, the presence of wrinkles on the face is advantageously taken into account when calculating the resulting BRDF in order to represent the fact, for example, that the makeup tends to accumulate in the creases formed by the wrinkles.

The invention also provides an assembly comprising apparatus for assistance in makeup as defined above together with apparatus enabling makeup to be dispensed that has a predetermined BRDF, as selected by the apparatus for assistance in makeup.

Such an assembly can advantageously be present at a site where cosmetics are sold.

The invention also provides a method enabling the application of a cosmetic and/or a care product to be simulated, the method comprising the steps consisting in:

measuring local phenomena of light interaction with a zone of the subject for known lighting and observation conditions;

using the measurements performed to calculate parameters enabling the BRDF of said zone to be calculated as a function of given lighting and observation conditions;

selecting a cosmetic and/or care product for which the parameters serving for calculating the BRDF are known;

calculating the BRDF that result on said zone of the subject after said product has been applied; and displaying said virtually made-up and/or treated zone on the basis of the previously calculated resulting BRDF for the given lighting and observation conditions.

In a particular implementation, the parameters enabling the BRDF to be calculated are the absorption coefficient $\mu_a(\lambda)$ and the diffusion coefficient $\mu_s(\lambda)$, the diffusion anisotropy factor a, the refractive index $n(\lambda)$, and the roughness coefficient m.

Preferably, the invention includes the step consisting in selecting the lighting conditions under which the virtually made-up and/or treated zone is to be displayed.

Thus, the user can visualize the rendition of makeup under various lighting conditions, and can choose the makeup that is best suited to a given event.

BRIEF DESCRIPTION OF THE DRAWINGS

Other characteristics and advantages of the present invention will appear on reading the following detailed description of a non-limiting example of an implementation of the invention, and on examining the accompanying drawings, in which:

FIG. 3 shows the unit solid angle $d\omega_i$ of the light incident on a target surface S of the subject, the direction of the incident light being identified in conventional manner in an orthogonal frame of reference XYZ associated with the surface S by an angle $\theta_i$ relative to the axis Z, and an angle $\phi_i$ relative to the axis X, in the plane XY of the surface S.

MORE DETAILED DESCRIPTION

Figure 1:
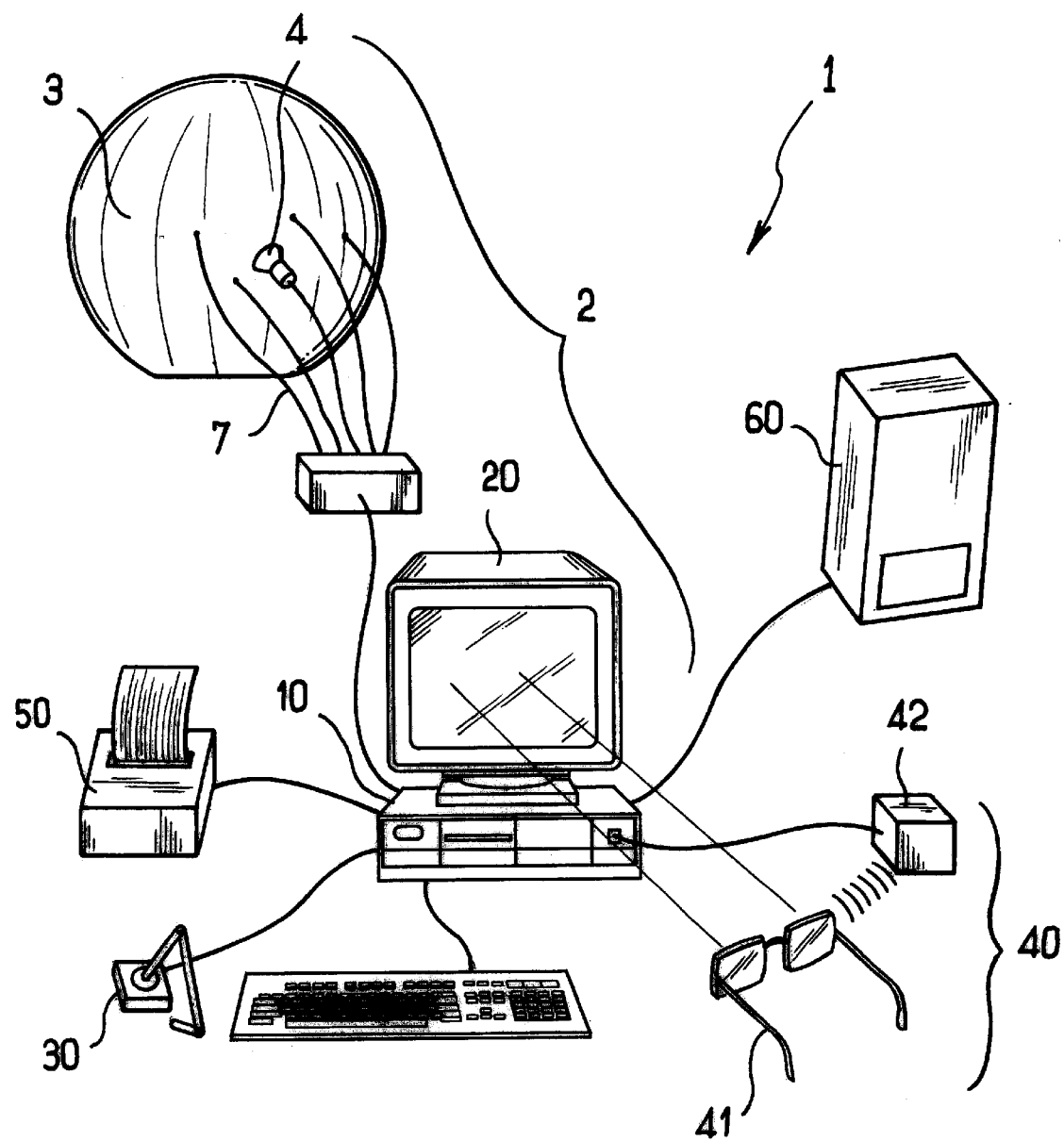
FIG. 1 is a diagrammatic view of apparatus for assistance in makeup constituting an embodiment of the invention.

The direction of the returned light is defined by an angle $\theta_r$ relative to the axis Z, and $\theta_r$ relative to the axis X in the plane XY.

In the meaning of the invention, BRDF is defined by the following equation:

$$f_r(\theta_i,\phi_i,\theta_r,\lambda) \equiv L_r(\theta_r,100_r,\lambda)/[L_i(\theta_i,\phi_i,\lambda)\cdot\cos\phi_i\cdot d\omega_i]$$

where $L_r$ is the energy luminance (or radiance) returned by an element of the surface and $L_i$ is the incident energy luminance (or irradiance) for the surface element.

For greater details concerning the parameters used in calculating BRDF, reference can usefully be made to the article entitled "Comprehensive physical model for light reflection" published in the journal Computer Graphics, 25 (4), August 1991, and to the article entitled "Reflection from layered surfaces due to subsurface scattering" published by the Computer Department of Princeton University, which describes how BRDF can be calculated by applying the Monte-Carlo method, and to the article by Cook and Torrance entitled "A reflection model for Computer graphics" published in ACM Transactions on Graphics 1 (1982), 7–24.

In an implementation of the invention, BRDF is modelled by the Monte-Carlo method in association with the Cook and Torrance method described in the above article.

Instead of the Monte-Carlo method, it is also possible to use the adding and doubling method associated with the radiant transfer equation.

For simplification purposes, it is preferably assumed that the light does not have any particular polarization, and that the BRDF of the subject does not depend on the angle $\phi_i$.

The Monte-Carlo method makes use of the parameter $\mu_a(\lambda)$ giving the absorption of the zone of the subject in question (e.g. the skin) as a function of wavelength $\lambda$, $\mu_s(\lambda)$ giving the diffusion of said zone, and a diffusion anisotropy factor a determined by the Henyey and Greenstein function, in a manner well known to the person skilled in the art.

The Cook and Torrance method makes use of parameters relating to the refractive index $n(\lambda)$ at the wavelength $\lambda$ and the roughness coefficient m.

Thus, in a preferred implementation of the invention, BRDF is calculated for given angles $\theta_i$, $\theta_r$, $\phi_r$, and for a wavelength $\lambda$, using the five parameters mentioned above.

These parameters are calculated from measurements performed on the subject.

More particularly, local measurements are performed enabling the BRDF value to be determined at a plurality of points on the subject for known lighting conditions and in known observation directions, for different known wavelengths $\lambda$.

Thereafter, the value to be given to each of the parameters $\mu_a(\lambda), \mu_s(\lambda)$, q, n($\lambda$), and m of the BRDF are sought to make the calculated BRDF values coincide with the values that are found by measurement.

In the embodiment described, to calculate the parameters $\mu_a(\lambda)$ and $\mu_s(\lambda)$, it is assumed that the skin is made up of three superposed layers having different optical properties, namely the stratum, the epidermis, and the dermis.

In this model, the effect of diffusion induced by the stratum is ignored.

The roughness coefficient m, calculated elsewhere, serves to take account indirectly of the incidence of the stratum on the reflection, the transmission, and the absorption of light.

It is assumed that the color of the epidermis depends on its melanin content, which can vary from one subject to another.

It is also assumed that the color of the dermis depends on its blood content and on its degree of oxidation.

The values to be given to variables specifying melanin content, blood content, and degree of oxidation are calculated in order to cause the spectral reflectance obtained by calculation to coincide with the measured spectral reflectance.

Once the melanin content, the blood content, and the oxidation level have been determined by calculation, the parameters $\mu_a(\lambda)$ and $\mu_s(\lambda)$ are deduced therefrom for the dermis and the epidermis by using data in the literature.

On this topic, reference can usefully be made to the article "Skin optics" by Steven L. Jacques, published in Oregon Medical Laser Center News, January 1998.

To perform the calculations enabling the melanin content, the blood content, and the degree of oxidation to be determined, it is possible to use calculation techniques such as the Newton Raphson technique, the Simplex technique, or the simulated annealing technique.

To determine the roughness coefficient m, the intensity of light reflected in the plane of incidence as a function of the angle of observation can be measured for incident light that is polarized parallel to the illuminated surface and for incident light that is polarized perpendicularly thereto.

By taking the difference, information is obtained that can be used for calculating the roughness coefficient m.

Once the parameters $\mu_a(\lambda)$, $\mu_s(\lambda)$, q, n($\lambda$), and m have been determined, the BRDF can be calculated as a function of the variables $\theta_i, \theta_r, \phi_r$, and $\lambda$ for the purposes of simulation.

FIG. 1 shows apparatus for assistance in makeup comprising a non-limiting example of how the invention can be implemented.

This apparatus 1 comprises a measuring unit 2 for measuring local phenomena of interaction between light and the zone to be made up, e.g. the face or a portion thereof.

Figure 2:
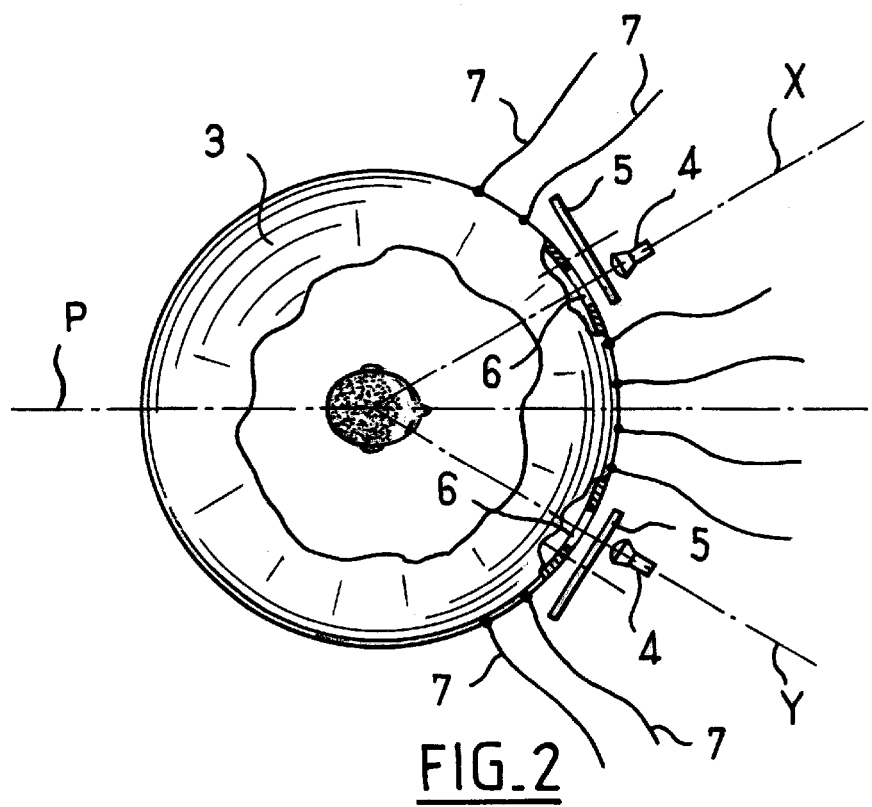
FIG. 2 is a partially cutaway diagrammatic plan view showing the sphere and the measurement unit.
Figure 3:
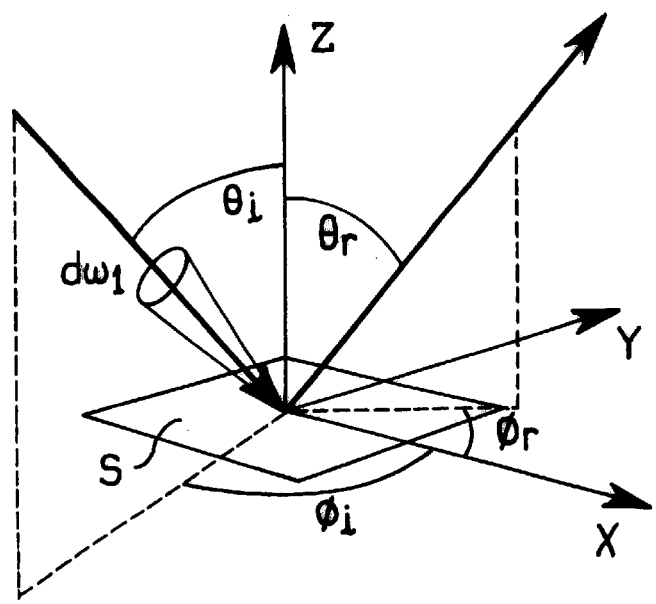
FIG. 3 shows the relative positions of the various angles used in calculating the BRDF.

As shown more particularly in FIG. 2, the measurement unit 2 comprises a sphere 3 whose inside surface is black and in which a person is situated while local optical data of the face or a portion of the face is being measured.

Two cameras 4 are arranged to observe simultaneously the subject placed in the sphere in stereo through chromatic filters 5 and openings 6 formed in the sphere, the observation directions of the cameras being at an angle to each other, one serving for example to acquire a front view and the other a profile view, or each serving to obtain a quarter view, as shown.

The cameras 4 serve, amongst other things, to acquire information relating to the topography of the face.

Lighting means are provided to illuminate the subject at various different known directions of incidence.

In the example described, the lighting means comprise a plurality of optical fibers 7.

By way of example, the chromatic filters 5 are placed on disks that can be rotated so as to place different filters in front of the objective lens of each camera 4 by turning the disks.

It will be understood that by lighting the subject in a predetermined manner from a plurality of points distributed over the surface of the sphere, and by acquiring images at different wavelengths by means of the filters 5 under each set of lighting conditions, information can be obtained that is representative of local phenomena concerning interaction of light with a zone of the subject, e.g. the skin of the face.

Measurements can thus be performed to determine the spectral reflectance of the zone to be made up.

The subject placed in the sphere can also be illuminated successively at different wavelengths, in which case there is no need to place chromatic filters in front of the cameras.

The measurement unit also has means enabling the intensity of light reflected in the plane of incidence to be measured for incident light that is polarized parallel to the illuminated surface and perpendicularly thereto, in order to calculate the roughness parameter m as explained above.

Figure 4:
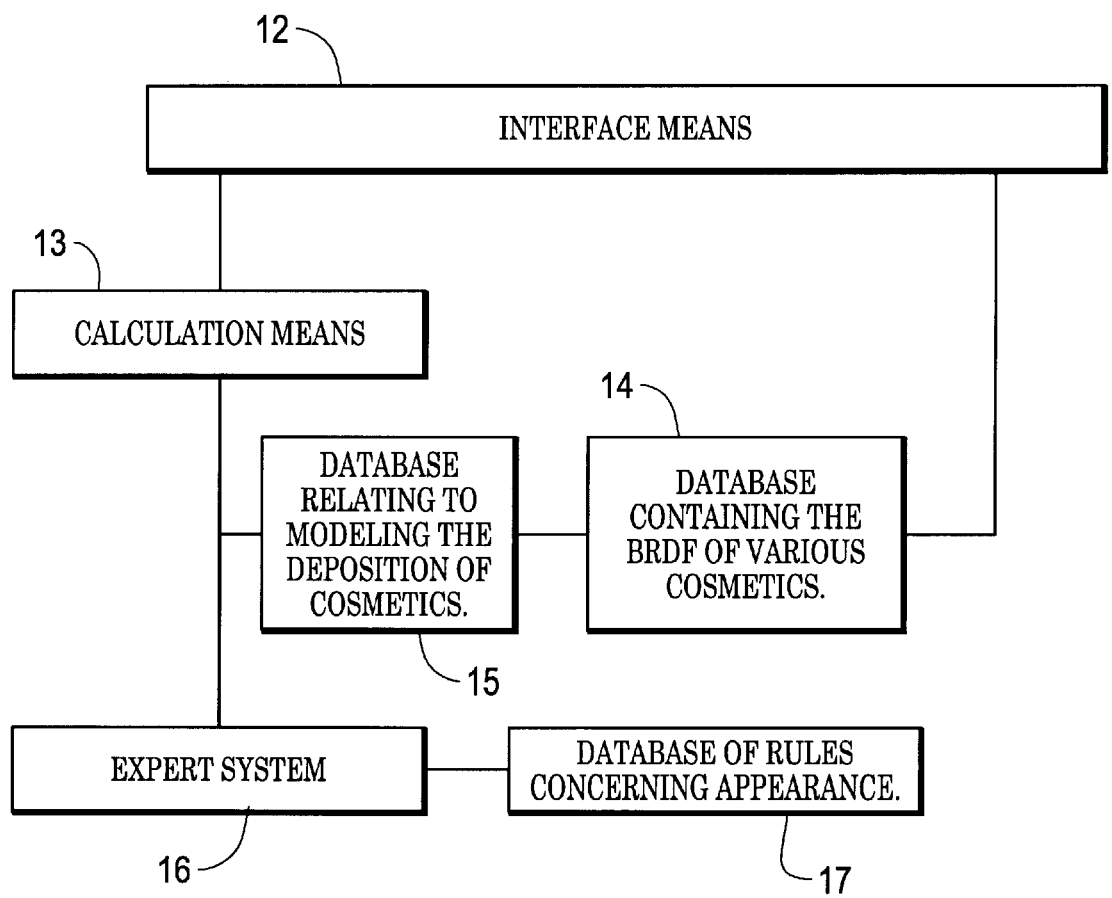
FIG. 4 is a block diagram showing the various functions of the apparatus.

Returning to FIG. 1, the apparatus for assistance in makeup includes a microcomputer 10 programmed to perform the various functions represented by the block diagram of FIG. 4.

More particularly, the microcomputer 10 includes calculation and interface means 12 for managing image acquisition.

These calculation and interface means 12 are advantageously arranged to calibrate the cameras in accordance with French patent No. 96/06425 in the name of the Applicant company.

The microcomputer 10 also has calculation means 13 implementing methods of calculation that serve in particular to recognize different portions of the face from the acquired images and to detect, where appropriate, the presence of wrinkles.

Calculation methods serving to recognize shapes are well known and reference can be made for example to above-cited international application WO 96/21201 or to the article entitled "Physically-based wrinkle simulation and skin rendering" by MIRALab, University of Geneva (1998).

The microcomputer 10 also has a database 14 containing the BRDF of various cosmetics and a database 15 relating to modeling the deposition of these cosmetics on the zone to be made up.

The BRDF of the cosmetics depends on the quantity spread onto the skin.

The database 14 takes this into account.

The microcomputer 10 also has an expert system 16 for determining which makeup to apply as a function of a database 17 of rules concerning appearance.

By way of example, the color of the cosmetic to be applied can be determined as a function of data given by the user, e.g. relating to skin type, color of the eyes or of the hair, and/or data coming from the acquisition unit concerning the features of the subject.

The apparatus 1 for assistance in makeup also includes a screen 20, a control member 30 constituted by a force feedback mouse, a stereoscopic display device 40, and a printer 50.

The force feedback mouse 30 enables the user to input information relating to the way in which a cosmetic should be applied.

Thus, by manipulating the control member 30, the user can simulate making up by means of a pencil and obtaining a mark that is colored to a greater or lesser extent depending on the pressure exerted on the control member 30.

By way of example, the stereoscopic display device 40 can comprise, as shown, a pair of spectacles having liquid crystal shutters that are shut in alternation by a control device 42 synchronously with images on the screen 20 that are intended respectively for the left eye and for the right eye.

The apparatus 1 operates as follows.

The user enters the sphere 3 and a program is launched to acquire the topography of the face and local data.

On the basis of the measurements performed, the microcomputer 10 calculates the BRDF parameters $\mu_a(\lambda)$, $\mu_s(\lambda)$, q, $n(\lambda)$, and m in the manner described above.

A cosmetic and/or care product is selected by the user or by the expert system 16, data relating to the BRDF parameters of the cosmetic as a function of the thickness with which it is deposited being stored in the database 14.

The microcomputer 10 calculates the resulting BRDF on the basis of the BRDF parameters of the subject, the BRDF parameters of the selected cosmetic, and data for modeling the way the cosmetic is deposited on the face, and in particular the thickness of the deposits, taken from the database 15, which data can, where appropriate, be added to or modified as a function of information that results from the way in which the force feedback mouse 30 is handled.

Optionally the color selected for the makeup can be modified.

Advantageously, the user specifies ambient lighting conditions, e.g. daylight, whether the lighting is diffuse or directional, and if artificial, whether it is of the fluorescent or incandescent type.

Once the resulting BRDF parameters have been calculated, the image of the virtually made-up face is displayed on the screen 20, which the user can observe in stereo by using the stereoscopic viewing device 40.

The direction from which the virtually made-up face on the screen is observed can be varied by turning the head.

Naturally, the invention is not limited to the embodiment described above.

It is possible to associate the apparatus for assistance in makeup with formulation apparatus 60 connected to the microcomputer 10 and making it possible, for example, to produce makeup having the color and where applicable the directional effects that are desired assuming that such makeup is not available in stock.

On this subject, reference can be made to U.S. Pat. No. 5,163,010, for example.

What is claimed is:

1. Apparatus for assistance in makeup, the apparatus comprising:
   a measurement unit for measuring local phenomena of light interaction with a zone of human body to be made up and/or treated;
   a database relating to at least one optical property of various cosmetic and/or care products;
   selector means enabling a product to be selected;
   calculation means for calculating least one resulting optical property of the zone of human body virtually made up or treated with the product, on the basis of at least one measurement previously taken and on the basis of information taken from said database and relating to the at least one optical property of the selected product; and
   display means for displaying the zone virtually made up or treated with the product as a result of the at least one previously calculated resulting optical property.

2. Apparatus for assistance in makeup according to claim 1, the calculation means being arranged to calculate parameters of a Bidirectional Reflectance Distribution Function (BRDF) of the zone to be made up and/or treated on the basis of at least one measurement performed.

3. Apparatus for assistance in makeup according to claim 1, the apparatus including a control member enabling a user to input information associated with the way in which the cosmetic product is to be applied to a face of the user.

4. Apparatus for assistance in makeup according to claim 3 wherein the control member comprises a force feedback mouse.

5. Apparatus for assistance in makeup according to claim 1, the apparatus including an expert system which, on the basis of data provided by a user, selects a makeup product as a function of predetermined criteria.

6. Apparatus according to claim 1, wherein the display means comprise stereoscopic display means.

7. Apparatus for assistance in makeup according to claim 1, wherein the measurement unit includes a sphere provided with means for lighting the subject present in the sphere and means for acquiring images that are arranged to enable local data of the subject to be acquired.

8. Apparatus for assistance in makeup according to claim 1, wherein the measurement unit includes apparatus for acquiring the topography of a face, which apparatus is selected from the following kinds of apparatus: stereo viewing apparatus that operates by simultaneous acquisition of a profile view and a front view; laser triangular apparatus; fringe projection apparatus.

9. Apparatus for assistance in makeup according to claim 1, wherein the measurement unit includes apparatus for acquiring the spectral reflectance of a face, enabling the color of the face to be determined at a set of points, at a given illumination angle, and at a given observation direction.

10. Apparatus for assistance in makeup according to claim 1, wherein the database relating to the at least one optical property of cosmetic and/or care products comprises a database relating to the at least one optical property of products selected from the following list: foundations, lipsticks, cheek blushers, eyeliners, mascara, nail varnishes, hair dyes, skin coloring products, semi-permanent makeup products (e.g. for tattoos).

11. Apparatus according to claim 10, wherein said database includes information relating to the at least one optical property of the products for different thicknesses of deposit.

12. Apparatus for assistance in makeup according to claim 1, wherein the measurement unit is associated with shape recognition means enabling parts of a face to be identified.

13. Apparatus for assistance in makeup according to claim 12, wherein the shape recognition means are arranged to detect wrinkles.

14. A system comprising apparatus for assistance in makeup as defined in claim 1, and apparatus enabling a product to be dispensed having at least one predetermined optical property as selected by the apparatus for assistance in makeup.

15. Apparatus according to claim 1, wherein the zone of human body is a face of a person.

16. Apparatus for assistance in makeup, the apparatus comprising:
    a measurement unit for measuring local phenomena of light interaction with a zone to be made up and/or treated;
    a database relating to a Bidirectional Reflectance Distribution Function (BRDF) of various cosmetic and/or care products;
    selector means enabling a product to be selected;
    calculation means for calculating the resulting BRDF of the zone virtually made up or treated with the product, on the basis of at least one measurement previously taken and on the basis of information taken from said database and relating to the BRDF of the selected product; and
    display means for displaying the zone virtually made up or treated with the product as a result of the previously calculated resulting BRDF, the apparatus further comprising calculation means arranged to calculate BRDF parameters of the zone to be made up and/or treated on the basis of the at least one measurement performed wherein the parameters used for calculating BRDF are the absorption coefficient $\mu_a(\lambda)$, the diffusion coefficient $\mu_s(\lambda)$ the diffusion anisotropy coefficient g, the refractive index $n(\lambda)$, and the roughness coefficient m, $\lambda$ being the wavelength of the light.

17. Apparatus according to claim 16, wherein skin parameters $\mu_a(\lambda)$ and $\mu_s(\lambda)$ are calculated on the basis of a model using as its variables the melanin content in the epidermis, the blood content in the dermis, and its degree of oxidation.

18. A method enabling the application of a cosmetic and/or care product to be simulated, the method comprising:
    measuring local phenomena of light interaction with a zone of human body of the subject for known lighting and observation conditions;
    using at least one measurements performed to calculate parameters enabling at least one optical property of said zone to be calculated as a function of given lighting and observation conditions;
    selecting a cosmetic and/or care product for which the parameters serving for calculating the at least one optical property are known;
    calculating at least one optical property that results on said zone of human body of the subject after said product has been applied; and
    displaying said virtually made-up and/or treated zone of human body on the basis of the at least one previously calculated resulting optical property for the given lighting and observation conditions.

19. A method according to claim 18, further comprising selecting the lighting conditions under which a virtually made-up and/or treated zone is to be displayed.

20. A method according to claim 18, wherein the zone of human body is a face of a person.

21. A method according to claim 18, wherein measuring includes acquiring the topography of the zone of human body.

22. A method according to claim 18, wherein measuring includes acquiring the spectral reflectance of the zone of human body.

23. A method according to claim 18, wherein calculating the at least one optical property comprises calculating a Bidirectional Reflectance Distribution Function (BRDF) of said zone as a function of given lighting and observation conditions.

24. A method enabling the application of a cosmetic and/or care product to be simulated, the method comprising:
    measuring local phenomena of light interaction with a zone of the subject for know lighting and observation conditions;
    using at least one measurement performed to calculate parameters enabling the Bidirectional Reflectance Distribution Function (BRDF) of said zone to be calculated as a function of given lighting and observation condition;
    selecting a cosmetic and/or care product for which the parameters serving for calculating the BRDF are known;
    calculating the BRDF that results on said zone of the subject after said product has been applied; and
    displaying said virtually made-up and/or treated zone on the basis of the previously calculated resulting BRDF for the given lighting and observation conditions, wherein the parameters enabling the BRDF to be calculated are the absorption coefficient $\mu_a(\lambda)$ and the diffusion coefficient $\mu_s(\lambda)$, the diffusion anisotropy factor g, the refractive index $n(\lambda)$, and the roughness coefficient m.

25. An apparatus comprising:
    a measurement unit for measuring local phenomena of light interaction with a zone of human body to be made up and/or treated;
    a database relating to at least one optical property of various cosmetic and/or care products;
    a computer configured to enable a product to be selected and to compute at least one resulting optical property of the zone of human body virtually made up or treated with the product, on the basis of at least one measurement previously taken and on the basis of information taken from said database and relating to the at least one optical property of the selected product, and
    at least one of a screen, a stereoscopic display device and a printer, for displaying the zone of human body virtually made up or treated with the product as a result of the at least one previously calculated resulting optical property.

26. Apparatus according to claim 25, wherein the zone of human body is a face of a person.

27. Apparatus according to claim 25, wherein said at least one optical property comprises a Bidirectional Reflectance Distribution Function (BRDF).

28. An apparatus comprising:
    a measurement unit for measuring local phenomena of light interaction with a zone of human body to be made up and/or treated;
    a database relating to at least one optical property of various cosmetic and/or care products;
    a selector system enabling a product to be selected;
    a calculation system for calculating at least one resulting optical property of the zone of human body virtually made up or treated with the product, on the basis of at least one measurement previously taken and on the basis of information taken from said database and relating to the at least one optical property of the selected product, and
    a display system for displaying the zone of human body virtually made up or treated with the product as a result of the at least one previously calculated resulting optical property.

29. Apparatus according to claim 28, wherein the zone of human body is a face of a person.

30. Apparatus according to claim 28, wherein said at least one optical property comprises a Bidirectional Reflectance Distribution Function(BRDF).

31. An apparatus comprising:
    a measurement unit for measuring local phenomena of light interaction with a zone to be made up and/or treated;
    a database relating to a Bidirectional Reflectance Distribution Function (BRDF) of various cosmetic and/or care products;
    a computer configured to enable a product to be selected and to compute the resulting BRDF of the zone virtually made up or treated with the product, on the basis of at least one measurement previously taken and on the basis of information taken from said database and relating to the BRDF of the selected product, and
    at least one of a screen, a stereoscopic display device and a printer, for displaying the zone virtually made up or treated with the product as a result of the previously calculated resulting BRDF,
    the computer being arranged to calculate BRDF parameters of the zone to be made up and/or treated on the basis of measurements performed, wherein the parameters used for calculating BRDF are the absorption coefficient $\mu_a(\lambda)$, the diffusion coefficient $\mu_s(\lambda)$ and the diffusion anisotropy coefficient g, the refractive index $n(\lambda)$, and the roughness coefficient m, $\lambda$ being the wavelength of the light.

32. An apparatus comprising:

a measurement unit for measuring local phenomena of light interaction with a zone to be made up and/or treated;

a database relating to a Bidirectional Reflectance Distribution Function (BRDF) of various cosmetic and/or care products;

a selector system enabling a product to be selected;

a calculation system for calculating the resulting BRDF of the zone virtually made up or treated with the product, on the basis of at least one measurement previously taken and on the basis of information taken from said database and relating to the BRDF of the selected product, and a display system for displaying the zone virtually made up or treated with the product as a result of the previously calculated resulting BRDF, the calculation system being arranged to calculate BRDF parameters of the zone to be made up and/or treated on the basis of the at least one measurement performed, wherein the parameters used for calculating BRDF are the absorption coefficient $\mu_a(\lambda)$, the diffusion coefficient $\mu_s(\lambda)$, the diffusion anisotropy coefficient g, the refractive index $n(\lambda)$, and the roughness coefficient m, $\lambda$ being the wavelength of the light.

* * * * *